United States Patent [19]

Pigneul et al.

[11] Patent Number: 4,978,565
[45] Date of Patent: Dec. 18, 1990

[54] ABSORBENT LAMINATED SHEET AND MANUFACTURING PROCESS FOR SUCH A SHEET

[75] Inventors: Raymond Pigneul, Durrenentzen; Rémy Ruppel, Horbourg; Pierre Laurent, Kunheim, all of France

[73] Assignee: Beghin-Say SA, Thumeries, France

[21] Appl. No.: 97,153

[22] Filed: Sep. 16, 1987

[30] Foreign Application Priority Data

Oct. 2, 1986 [FR] France ................................ 86-13769

[51] Int. Cl.$^5$ .......................... B32B 3/00; B31F 1/20; D21H 11/00
[52] U.S. Cl. .................................... 428/156; 156/166; 156/181; 156/207; 156/209; 156/210; 156/219; 156/462; 156/470; 156/471; 156/549; 156/551; 156/553; 156/555; 156/582; 428/119; 428/120; 428/154; 428/166; 428/171; 428/172; 428/178; 428/179; 428/184; 428/198; 428/211; 427/264; 427/275; 427/288; 162/109; 162/112; 162/115; 162/117; 162/296; 162/362; 118/211
[58] Field of Search ............... 428/154, 166, 174, 178, 428/179, 156, 171, 172, 165, 161, 119, 120, 173, 180, 183, 184, 192, 201, 211; 118/211, 248; 156/166, 180, 181, 179, 199, 205, 207, 209, 210, 219, 220, 296, 324, 462, 470, 471, 549, 551, 553, 555, 582; 427/264, 275, 276, 277, 278, 288, 294; 162/18, 109, 111, 112, 115, 117, 118, 119, 136, 137, 231, 296, 300, 362

[56] References Cited

U.S. PATENT DOCUMENTS

| | | | |
|---|---|---|---|
| 3,650,882 | 3/1972 | Thomas | 428/166 X |
| 3,673,060 | 6/1972 | Murphy et al. | 428/179 |
| 3,788,905 | 6/1973 | Thomas | 428/178 |
| 3,961,119 | 6/1976 | Thomas | 428/178 |
| 4,127,637 | 11/1978 | Pietreniak et al. | 428/171 X |
| 4,134,948 | 1/1979 | Baker, Jr. | 428/171 X |
| 4,135,024 | 1/1979 | Callahan et al. | 428/171 |
| 4,307,141 | 12/1981 | Walburn | 428/178 |
| 4,481,243 | 11/1984 | Allen | 428/165 X |
| 4,483,728 | 11/1984 | Bauernfeind | 428/154 |
| 4,659,608 | 4/1987 | Schulz | 428/172 X |
| 4,759,967 | 7/1988 | Bauernfeind | 428/156 X |

Primary Examiner—Patrick Ryan
Assistant Examiner—Donald J. Loney
Attorney, Agent, or Firm—A. W. Breiner

[57] ABSTRACT

The absorbent laminated sheet is composed of at least two plies (1.9), embossed, constituted essentially of cellulose fibers, bonded together at least partially by means of protruding elements relative to the surface of said plies and pointing inward to the sheet; it is characterized in that the protruding elements (101) are positioned essentially according to lines or combinations of lines reproducing spaced motifs (100), which recur indefinitely.

Application as domestic or sanitary paper.

5 Claims, 2 Drawing Sheets

ABSORBENT LAMINATED SHEET AND MANUFACTURING PROCESS FOR SUCH A SHEET

The present invention relates to an absorbent laminated sheet comprising at least two embossed plies, constituted essentially of cellulose fibers, notably cellulose wadding. This type of product finds, in particular, an application in the field of paper with domestic and sanitary uses after being transformed into napkins, toweling, toilet tissue or other similar articles.

In this field, efforts have been made to propose products combining both quality and softness, volume and absorbency. In particular, efforts are being made to improve the bulky quality as the user associates this with softness and suppleness.

Moreover, the bulky texture enhances the presentation of the product especially when transformed into rolls for, given the same number of sheets, a roll is obtained with a larger diameter and a velvety touch.

A well-known embodiment of laminated sheets with at least two plies, consists in separately embossing each of the two plies between a rubber-surfaced cylinder and a metal cylinder with protruding elements, engraved or mounted onto the surface. After embossing, an adhesive substance is applied to the protruding parts of one or of both plies by means of a roller applicator, then both plies are joined by their protruding elements by passing them through the press gap formed by the two metal embossing cylinders which roll against each other. The cylinders are synchronized during rotation so that the protruding elements come together at least partially to bind the plies. Such a process, followed if necessary by calendering the laminated sheet, is described in U.S. Pat. No. 3,414,459. According to this patent, the protruding elements are low-profiled transverse protuberances evenly distributed along the surface of the plies. They are relatively high in number. It is mentioned for example that it is preferable to emboss the plies at the rate of 16 protuberances per $cm^2$.

The U.S. Pat. No. 4,376,671 also describes a laminated structure constituted by an even number of plies associated with their embossing motifs. A first embossing motif is distinguished by fairly wide spacing and a second motif constituted of protuberances with smaller spacing, reduced height and surrounding the former. The embossed sections of each ply being set to face each other, the bond is only ensured by the first motifs. A bulky product is obtained with improved suppleness whereby the protuberances shape the paper between the spaced motifs, without making it too rigid.

The U.S. Pat. No. 4,326,002 describes a laminated structure composed of two embossed plies whereby the protuberances, projecting in toward the sheet, are either inserted—the top of the protuberances of a sheet being in contact with the opposing sheet between two protuberances—or positioned point against point. As in the preceding patents, these protuberances are relatively close to each other. The structure comprises an additional embossing motif with wider spacing than the previous one. This second motif is done through the sheet itself and not on each ply as in U.S. Pat. No. 4,376,671. The aim is also to improve both the appearance of the complex and the qualities of softness, absorption and volume.

The FR patent No. 2537920 describes a multi-ply sheet of paper, presenting a motif obtained by embossing the sheet between two metal cylinders. The latter include protruding elements and recessed elements separated by a neutral plane. Embossing is carried out by meshing the projections of one cylinder with the depressions of the other. Note that the entire embossed zones reproduce a flower design which is thus drawn point by point.

The products in conformity with the patent all have protruding elements relatively close to one another. This requirement seems to come from the need to shape the complex enough so that the plies remain spaced and are not crushed against each other.

In U.S. Pat. Nos. 4,376,671 and 4,326,002 the additional motif with wide spacing is primarily for esthetic reasons. Unfortunately, embossing done by closely positioned points weakens the paper; as a result, the complex presents tensile strength values inferior to those held as being normal for this type of product, especially with respect to toilet tissue for which low substance cellulose wadding of about 15 to 17 gsm is used. If a higher quantity of glue is used to remedy this fault, softness is affected and the product is made stiffer.

It has now been ascertained, in conformity with the invention, that a laminated sheet can be produced with satisfactory volume or bulk in texture, without damaging the intrinsic qualities of softness of each ply.

Thus, according to the invention, an absorbent, laminated sheet composed of at least two embossed plies, bonded together at least partially by protruding elements relative to the surface of said plies and pointing inward to the sheet, is characterized in that the protruding elements are positioned on each ply essentially according to lines or combinations of lines to reproduce spaced motifs which recur indefinitely.

Thus, the product is characterized by the absense, or almost total absense, of low-profiled protuberances on the plies, contrary to previous art. The result is an astonishing structure offering a satisfactory bulky texture which is enough to allow transformation into rolls or packets of interlocking sheets with a volume comparable to other laminated structures bonded point to point and embossed according to a high density of protuberances, without presenting the disadvantages resulting from a reduction in mechanical strength.

The motif repeated by embossing may be a geometrical figure, a stylized flower or any other attractive design.

The motif shall be preferably contained in a polygon with a total area between 2 and 4 $cm^2$. In addition, the surface covered by the embossing in each motif and the number of motifs shall be chosen so that the total embossed surface represents preferably 5% to 20% of the total surface of the sheet. This arrangement gives optimal results between the bulky texture and the rigidity due to the bonding surfaces between plies.

According to an additional feature of the invention, bonding is ensured by applying less than 1 gsm of glue to the embossed surfaces, preferably about 0.015 gsm. This tiny quantity guarantees optimal softness of the product with regard to individual plies.

The invention will now be described in greater detail, with reference to the accompanying drawings, in which.

Figure 1:
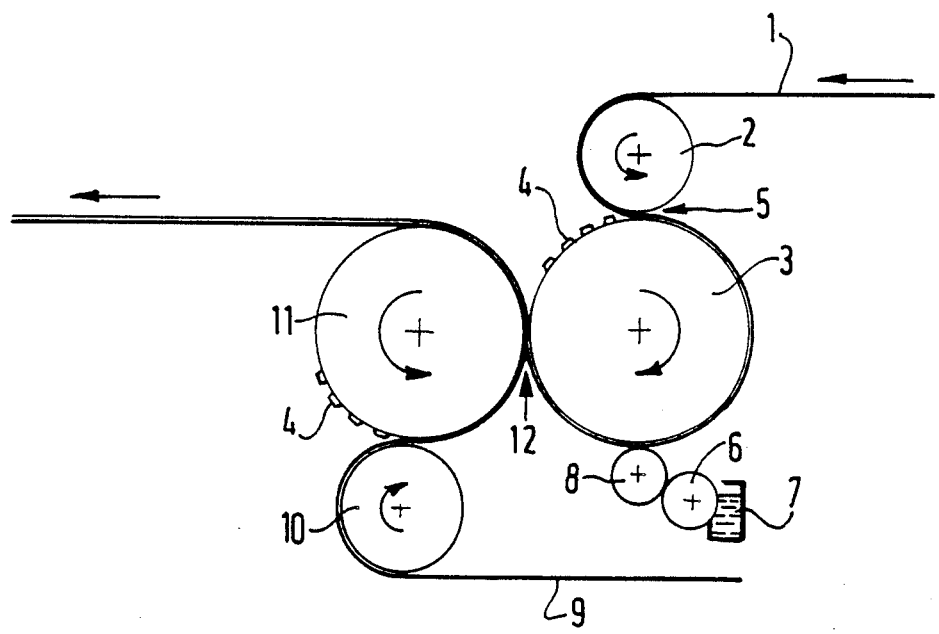
FIG. 1 is a schematic representation of an embossing and bonding application allowing the production of laminated sheets in conformity with the invention.

The application in FIG. 1 comprises two cylinder rollers 3, 11, of equal diameter, mounted in rotation around parallel axes lying in the same horizontal plane. The surface of each embossing roller is provided with elevated elements 4, built up or obtained directly by engraving the metal. These elements are cut according to the motif to be reproduced on the sheets of cellulose wadding. It may be a simple geometric motif, a flower, etc. The surfaces of these elevated elements are turned outward and are set in a cylindrical surface concentric to the rollers.

The rollers are separated by a press gap 12 set between both cylindrical surfaces. They are rotated in synchronization, in opposite directions, by appropriate means such as gears or belts. Within this press gap, the elevated elements coincide with each other and squeeze the sheets of cellulose wadding between their flat sections as they are introduced. Each of the embossing rollers 3, 11 collaborates with a flexible rubber roller 2, 10 with which it creates a press zone where the elevated elements 4 of the metal rollers penetrate the flexible material of the counter-rollers. Consequently, the fibrous sheet undergoes a permanent plastic deformation when moving across this gap 5, and the motif drawn on the metal rollers are reproduced in relief onto the sheet.

The association of the two sheets in a laminated sheet structure is carried out in the following manner: a sheet of cellulose wadding 1, for example, with a basis weight included between 14 gsm and 60 gsm is rolled out from a feeder spool, not shown, and driven in the direction of the arrow. It moves around the rubber roller 2 to be squeezed in 5 between this roller and the metal embossing roller 3 whose elevated elements 4 penetrate the sheet to deform it plastically. Impression jacks, not represented, press the rubber roller 2 onto roller 3 with enough force to carry out embossing of the sheet which, on exiting the press zone 5, adheres to the contour of the embossing cylinder with its elevated elements 4. By following the movement of roller 3, the sheet reaches a flexographic glue applicator. A damping roller 6, made of steel, collects the adhesive substance from a reservoir 7, and carries it back to the smooth surface of a rubber transfer roller 8 which is in contact, and rolls on the roller 3. A film of adhesive substance is deposited in this way on the surface of the sheet 1, onto the embossed sections.

Just as for sheet 1, a sheet of cellulose wadding 9 is unrolled from the feed spool, not represented, and pulled around a rubber roller 10.

The sheet is embossed on passing between this impression roller 10 and the metal embossing roller 11; it then presses onto the surface of the latter and embraces its contour. Both sheets 1 and 9 converge in their movement toward the press gap 12 created between rollers 3 and 11. The rollers rotate in opposite directions at identical speeds in such a manner as to roll against each other without slipping. The angle of reference of the rollers was adjusted so as to bring the elevated elements of each respective roller in a corresponding position, when they go through the press gap. Thus, the two sheets come together in this gap and are joined by their elevated sections. They adhere together by means of the adhesive film applied on sheet 1. Jacks, not shown, exert enough pressure on the rollers to give this bond the desired resistance. The flat sections of the elevated elements are wide enough to give an extensive contact zone. In practise, the elevated elements are cut so that their flat sections have a width included between 0.5 and 1 mm.

The composite sheet is then directed toward a well-known reeling system to be later transformed into toweling, toilet tissue or other applications.

In one application in which the embossing cylinders lie on the same horizontal plane, the rubber transfer roller 8 of the glue application device is positioned in the lower section of the installation, as close as possible to the press gap, so as to reduce as much as possible the time during which the glue diffuses across the sheet of fibers and to eliminate rapid accumulation of dirt in the cylinders.

In fact, the glue applicator can be adjusted so that the quantity of glue deposited on the paper is just enough to ensure bonding of the plies. The adjustment range will extend for example from 0.85 gsm to 0.010 gsm for an adhesive solution of at least 40% of dry matter. This ratio is designed to limit the humidity level of the finished product and avoid deformation. Moreover, viscosity should not exceed 1000 centipoise for reasons of high-speed machinability. However, the migration time of the glue across the paper must also be taken into account. For the lowest rotation speed of the embossing cylinders, the glue deposit zone should not be too distant from the uniting position in order to eliminate the possibility of the glue crossing the paper, with the risk of blocking the cylinders by too great a pressure in the press zone at the moment of bonding the plies. The deposit of glue on the cylinders is not desirable for it increases the adherence of the plies to the metal and it is likely to make the sheet wrap around the cylinders which, apart from machine breakdowns, causes rapid deterioration. Such an undesirable deposit also damages the rubber cylinders and reduces their service life owing to the frequent adjustments which become necessary. In the event of a small deposit of adhesive substance, the risk of blocking the cylinders is reduced since the volume absorbed is less than the capacity of absorption of the paper. However, the bonding surface should not be allowed to deteriorate as a result of glue deposits.

Thus, within the framework of an embossing device composed of two cylinders 50 cm in diameter and rotating at a linear speed varying between 200 meters/minute and 500 meters/minute, said device being used to emboss and bind sheets of cellulose wadding with a basis weight included between 14 gsm and 25 gsm and preferably between 14 gsm and 18 gsm, the glue, at a minimum 40% of dry matter being deposited at a rate included between 0.010 gsm and 0.85 gsm, it became evident that the optimal position for the application roller was situated within the quarter turn upstream from the press gap.

Figure 2:
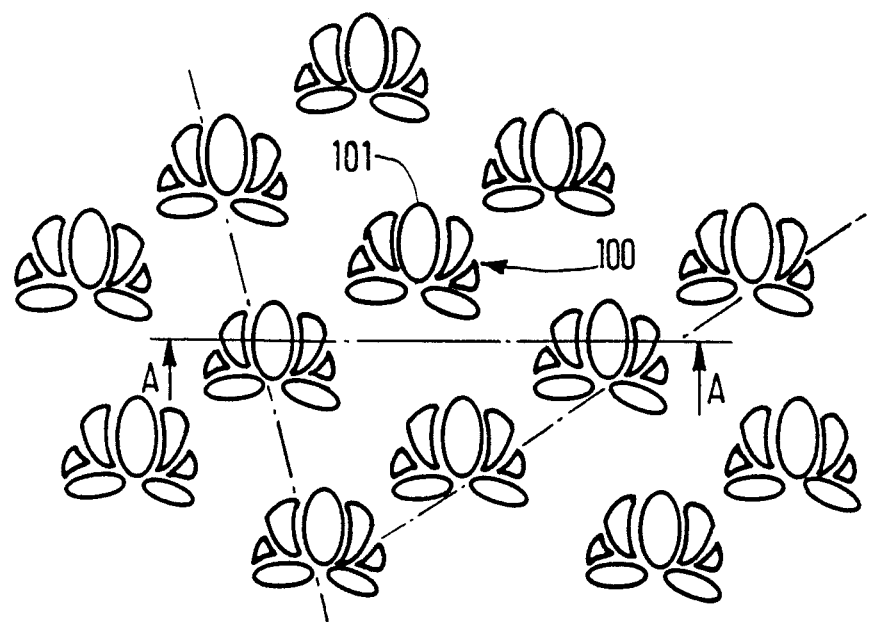
FIG. 2 represents a plan view of a sheet in conformity with the invention obtained with the application in FIG. 1.
Figure 3:
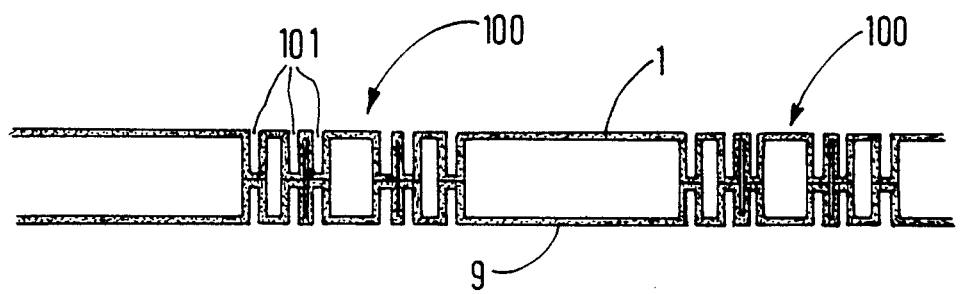
FIG. 3 is an enlarged cross section illustrating the sheet in FIG. 2 according to AA.

FIGS. 2 and 3 illustrate an embodiment of a laminated sheet in conformity with the invention. It comprises two sheets of cellulose fibers 1 and 9. The sections deformed by embossing form, in plan view, continuous lines 101 combined so as to draw the contour of a motif 100, a stylized flower in the present case. The height of these parts 101 which was exaggerated in FIG. 3 is enough to increase the thickness of the plies by up to 100%.

The thickness of the lines corresponds to width of the elevated elements in FIG. 1. In order to permit linear contact and give sufficient ply resistance, this thickness should be about 0.5 to 1 mm, preferably from 0.7 to 0.9 mm.

The motif whose contours are drawn by the deformed zones is contained in a polygon with a surface area included between 2 and 4 cm². The deformed zones themselves cover 40% to 60% of the motif. This motif is repeated indefinitely and evenly according to two inclined directions relative to the machine direction of the sheet. This arrangement offers the advantage of avoiding superimposing the motifs during subsequent transformation of the sheet into rolls of toweling or toilet tissue especially. Whatever the mode of distribution, the number of such motifs per surface unit is included between 800 and 1600 per m² so that they are spaced by no less than 5 mm and secondly, so as to maintain embossed surface density at a value included between 5% and 20% of the total surface of the sheet. For, embossing covering less than 5% of the sheet does not offer sufficient thickness and in contrast, when embossing covers more than 20% of the sheet, this causes excessive rigidity which affects softness.

EXAMPLE

A laminated sheet was done from two plies of cellulose wadding 15.5 gsm each, dry-creped with 21 crests per cm. The plies were calendered so as to lower the crests from creping and to calibrate thickness, this being from 0.85 mm for 10 superimposed plies. Before forming the sheet, the dry bursting strength for two plies 15 mm wide was 320 CN in the machine direction and 120 CN in cross direction. The elongation in machine direction was 15.5%. A flower motif was chosen covering a unit surface of 250 mm² and repeated at the rate of 1300 motifs per m² in such a way that the total embossed surface represents 15.5% of the surface of the sheet. Embossing permitted an increase in thickness which moved to 1.3 mm for 5 superimposed sheets. The glue was solution with 45% dry matter of a thermosetting resin of a type commonly used in this application. The glue application device of FIG. 1 was adjusted to apply a quantity of 0.015 gsm on the raised surfaces. A 15 mm sample of the sheet was tested for bursting strength. This was 250 CN in machine direction and 100 CN in cross direction.

For the sake of comparison, a second sheet was done with the same motif as before but also with an embossing by point between the motifs at the rate of 5.5 points per cm², each with a diameter of 0.7 mm. A marked drop in the resistance of the sheet was observed, the bursting strength of a 15 mm wide sample was no more than 225 CN in machine direction and 85 in cross direction. This resistance was further decreased at 9.5 points per cm², the bursting strength of the sheet being no more than 120 CN in machine direction and 55 in cross direction.

We claim:

1. An absorbent laminated sheet comprising at least two embossed plies constituted essentially of cellulose fibers, bonded to each other by the protruding elements that are embossed in said plies and pointing inward to said sheet, an adhesive being deposited on the embossed surface at a rate lower than 1 gsm, said protruding elements being linear with a width between about 0.7 and 0.9 mm and designed to reproduce figures covering a surface area between about 2 and 4 cm² that are spaced from each other and separated with regions without embossments, said embossed area representing 40% to 60% of the surface of each figure.

2. A laminated sheet according to claim 1 wherein the surface covered by the embossing in each figure and the number of figures are chosen so that the total embossed surface covers from 5% to 20% of the surface of the sheet.

3. A laminated sheet according to claim 2 wherein the number of figures is between 800 and 1600 per square meter of said sheet.

4. A laminated sheet according to claim 1 wherein said rate of adhesive which is deposited is in the region of 0.016 gsm.

5. A method of manufacturing an absorbent laminated sheet according to claim 1 wherein said cellulose fibers have a base weight between 14 and 25 gsm and said laminated sheet is formed by passing said plies between metal cylinders having elevated elements to emboss said plies, depositing glue onto the deformed sections of one of said plies, and bonding said plies by pressing said plies between said cylinders at a press point, said cylinders being driven in rotation at a speed corresponding to a linear speed between 200 and 500 meters/minute, and said glue being deposited at a rate between 0.010 and 0.85 gsm in a zone situated upstream from said press point at a maximum of a quarter turn of the circumference of the cylinders.

* * * * *